June 4, 1940.　　　　　F. MEINHARDT　　　　　2,203,303
SCREW ADJUSTING MECHANISM
Filed Oct. 8, 1938
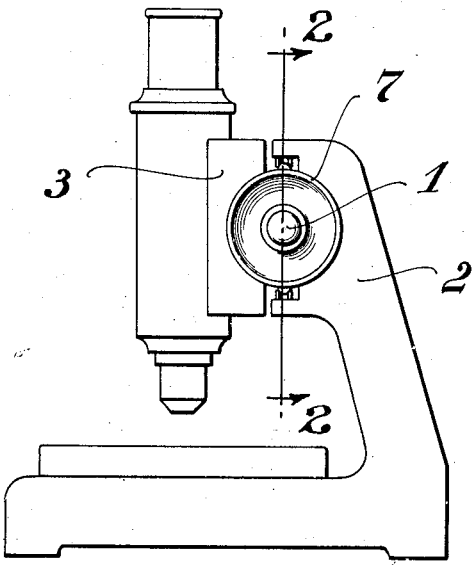
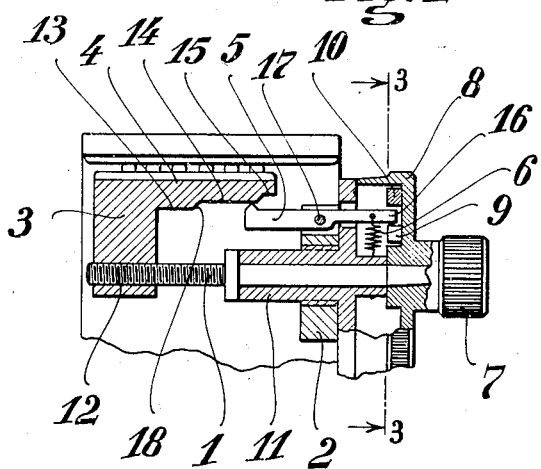
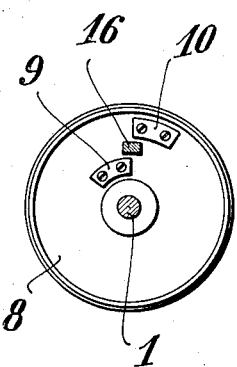
INVENTOR
*Fritz Meinhardt*
BY
*Ivan E. A. Konigsberg*
ATTORNEY Patented June 4, 1940

2,203,303

UNITED STATES PATENT OFFICE 2,203,303

SCREW ADJUSTING MECHANISM

Fritz Meinhardt, Wetzlar, Germany, assignor to Ernst Leitz, G. m. b. H., Wetzlar, Germany Application October 8, 1938, Serial No. 233,899
In Germany November 13, 1937

5 Claims. (Cl. 88—39)

This invention relates to screw adjusting mechanisms of the type in which a slidable member is operatively connected to a screw so as to be adjusted axially of the screw when the latter is rotated. Such screw adjusting mechanisms are used for instance in the fine adjustment of a microscope and for micrometer purposes and the like.

In such mechanisms it is of importance to provide means for definitely preventing rotation of the screw beyond that which is required for moving the sliding member between the limits of adjustment thereof. So long as the sliding member is merely adjusted back and forth between its limits of movements, the screw functions to effect such movement. When however the sliding member has reached its intended limit of movement in either direction, it is desirable that means be provided for preventing further rotation of the screw in order that the latter may not be damaged by excessive strain or by being jammed or because too much pressure is being put upon the screw.

The object of the invention is to provide an improved mechanism of the type and for the purpose set forth.

Prior mechanisms for this purpose have been proposed. For instance it has been proposed to provide a movable member actuated by the adjusting screw itself and adapted to engage a fixed member at the end of the adjusting movement for preventing further rotation of the screw. However such a device does not prevent overturning or jamming of the screw and damage may result.

It has also been proposed to provide the screw with a number of washers provided with means for engaging each other as the screw is rotated. The last washer engages a fixed stop and thus further rotation of the screw is prevented. Such a device necessarily includes a certain amount of play between the washers so that these function like a cushion or become yielding to some extent so that an exact limitation of the rotative movement of the screw is not possible and of course a certain amount of the adjusting power of the screw is being diverted to operating the washers. Also with such a construction the exactitude of the mechanism is disadvantageously affected.

This invention provides means independent of the rotative movement of the screw to prevent rotation of the screw beyond that which is required to adjust the slidable member. Accordingly the invention is embodied in a screw adjusting mechanism arranged and constructed as hereinafter set forth and as illustrated in the accompanying drawing in which Fig. 1 is a side view in outline of a microscope equipped with a screw adjusting mechanism according to this invention.

Fig. 2 is a detail view of the screw adjusting mechanism with parts in section and parts broken away, the section being taken on line 2—2 of Fig. 1.

Fig. 3 is a sectional view on the line 3—3 of Fig. 2.

In the drawing the microscope is identified by its stand 2, the fine adjustment screw 1 and the tube carrier 3. The latter is horizontally adjustable by rotation of the screw 1 as is usual. As shown in Fig. 2 the screw 1 is supported in a fixed bearing 11 in the fixed member, in this case the stand 2. The tube carrier 3, i. e. the slidable member is in threaded engagement with the screw as indicated at 12. The slidable member is provided with a stepped cam 4 having controlling surfaces or steps 13, 14 and 15. The screw 1 is operable by a knob 7 and carries a drum 8 having two stops 9 and 10 spaced radially at different distances from the center of the screw as shown in Fig. 2.

The stops are adapted to be engaged by the tail end 16 of a stop lever 5 which is pivoted at 17 in the fixed part 2. The stop lever is maintained in constant engagement with any one of the cam surfaces by means of a spring 6. The tail end of the lever 5 extends into the paths of rotation of the stops 9 and 10 when the slidable member has reached the end of its adjusting movement in either direction as will be presently explained.

When the member 3 is to be adjusted the screw 1 is rotated and the screw is freely rotatable for such adjusting purposes so long as the stop lever 5 engages the cam step 15. When the slidable member has reached the limit of its movement in one direction, for instance to the left in Fig. 2, the lever 5 will be moved by the spring into contact with the cam step 15. The tail end 16 of the lever will be tipped down and will then lie in the path of the movement of the stop 9 whereby further rotation of the drum 8 and the screw 1 is prevented. Hence there will be no jamming or forcing of the screw threads at 12 and the screw remains unimpaired.

When now the screw is rotated in the opposite direction, the lever 5 is moved from the step 15 to the step 14. The tail end 16 of the lever is then raised back into normal inactive position as shown in Fig. 3 and the adjustment may be accomplished. At the end of the rightward movement of the slidable member 3, the cam step 13 will engage the lever 5 to tip the latter. Now the tail end 16 will be raised into the path of movement of the stop 10 and further rotation of the screw is prevented.

The steps of the cam 4 are joined by bevelled portions 18 so that lever 5 slides easily from one step to another. These bevelled portions also serve to gradually raise or lower the tail end of the lever 5 during the last rotation of the screw at ends of the step 14 to insure that the stops 9 and 10 will be in the position shown in Fig. 3 to effect immediate stoppage of the rotation of the screw 1 when the sliding member has been adjusted in either direction the length of the cam step 14.

While the invention has been disclosed in connection with the fine adjustment of a microscope it will be understood that such disclosure is by way of example and not as a limitation in the use of the invention.

I claim:

1. In a mechanism of the character described the combination of a slidable member, a screw in threaded engagement therewith, supporting means for said screw, means for rotating said screw to move the slidable member a given distance in opposite directions, two stop members, means supporting the same to rotate with said screw, a pivoted lever engaging said slidable member and adapted to be moved into the path of movement of either of said stop members, a cam on said slidable member normally maintaining said lever out of the path of movement of said stop members and other cams on said slidable member for automatically moving the lever into the path of movement of either one of said stop members to prevent rotation of the screw when said slidable member has been moved the said given distance in either direction and means for supporting said pivoted lever in operative relation to said slidable member and to the said stop members.

2. In a mechanism of the character described the combination of a slidable member, a shaft in threaded engagement therewith, supporting means for said shaft, means for rotating said shaft to move said slidable member in opposite directions, mechanism for preventing rotation of said shaft when said slidable member has reached the limit of its movement in either direction, said mechanism comprising stopping means rotatable by and with said shaft, a lever pivoted on said shaft supporting means in operative relation to said stopping means and said slidable member, means normally urging said lever into operative engagement with said slidable member and means on the latter for moving said lever into engagement with said stopping means to stop rotation of said shaft when said slidable member has reached the limit of its movement in either direction.

3. In a mechanism of the character described the combination of a slidable member, a shaft in threaded engagement therewith, supporting means for said shaft, means for rotating said shaft to move said slidable member in opposite directions, mechanism for preventing rotation of said shaft when said slidable member has been moved into a predetermined position by rotation of said shaft, said mechanism comprising stopping means rotatable by and with said shaft, a member pivoted on said shaft supporting means and adapted to be moved into the path of movement of said stopping means, a spring for keeping said pivoted member in surface contacting engagement with said slidable member and means on the latter for moving said pivoted member into engagement with said stopping means when said pivoted member has reached the said predetermined position.

4. In a mechanism of the character described the combination of a slidable member, a shaft in threaded engagement therewith, supporting means for said shaft, means for rotating said shaft to move said slidable member in opposite directions, mechanism for preventing rotation of said shaft when said slidable member has reached the limit of its movement in either direction, said mechanism comprising stopping means rotatable by and with said shaft, a lever pivoted on said shaft supporting means in operative relation to said stopping means and said slidable member, means normally urging said lever into operative engagement with said slidable member and stepped cam means in the latter for moving said lever into engagement with said stopping means to stop rotation of said shaft when said slidable member has reached the limit of its movement in either direction.

5. In a mechanism of the character described the combination of a slidable member, a shaft in threaded engagement therewith, supporting means for said shaft, means for rotating said shaft to move said slidable member in opposite directions, mechanism for preventing rotation of said shaft when said slidable member has been moved a given distance in either direction by rotation of said shaft, said mechanism comprising stopping means rotatable in synchronized relation to the rotation of said shaft, means for rotating said stopping means, a pivoted lever one end of which is adapted to be moved into the path of movement of said stopping means, means for keeping the other end of said lever in operative engagement with said slidable member, means on the latter for moving the said one end of said lever into the path of movement of said stopping means to stop rotation thereof and of said shaft when said slidable member has been moved said given distance and means for supporting said pivoted lever in operative relation to said stopping means and said slidable member.

FRITZ MEINHARDT.